(12) United States Patent
Zhao et al.

(10) Patent No.: US 11,975,489 B2
(45) Date of Patent: May 7, 2024

(54) 3D PRINTING SYSTEM AND METHOD

(71) Applicants: NISSAN NORTH AMERICA, INC., Franklin, TN (US); NORTHWESTERN UNIVERSITY, Evanston, IL (US)

(72) Inventors: Nanzhu Zhao, Novi, MI (US); Sandeep Patil, Farmington Hills, MI (US); Cheng Sun, Wilmette, IL (US); Rihan Hai, Evanston, IL (US)

(73) Assignee: Nissan North America, Inc., Franklin, TN (US)

( * ) Notice: Subject to any disclaimer, the term of this patent is extended or adjusted under 35 U.S.C. 154(b) by 70 days.

(21) Appl. No.: 17/535,546

(22) Filed: Nov. 24, 2021

(65) Prior Publication Data
US 2023/0158744 A1  May 25, 2023

(51) Int. Cl.
| | |
|---|---|
| B29C 64/314 | (2017.01) |
| B29C 64/129 | (2017.01) |
| B29C 64/232 | (2017.01) |
| B29C 64/245 | (2017.01) |
| B29C 64/264 | (2017.01) |
| B33Y 30/00 | (2015.01) |
| B33Y 40/10 | (2020.01) |

(52) U.S. Cl.
CPC .......... *B29C 64/314* (2017.08); *B29C 64/129* (2017.08); *B29C 64/232* (2017.08); *B29C 64/245* (2017.08); *B29C 64/264* (2017.08); *B33Y 30/00* (2014.12); *B33Y 40/10* (2020.01)

(58) Field of Classification Search
CPC .... B29C 64/124; B29C 64/129; B29C 64/135
See application file for complete search history.

(56) References Cited

U.S. PATENT DOCUMENTS

| | | | |
|---|---|---|---|
| 2015/0072293 A1 | 3/2015 | DeSimone et al. | |
| 2017/0129052 A1 | 5/2017 | Buller et al. | |
| 2018/0243987 A1* | 8/2018 | Nesbitt | ................... B33Y 30/00 |
| 2019/0160733 A1* | 5/2019 | Mirkin | ................... B29C 67/24 |
| 2020/0061904 A1 | 2/2020 | Kim et al. | |

FOREIGN PATENT DOCUMENTS

| | | |
|---|---|---|
| JP | 2018535121 A | 11/2018 |
| WO | 2017010645 A1 | 1/2017 |

OTHER PUBLICATIONS

Vamshi Krishna Chillara et al, "Ultrasonic waves from radial mode excitation of a piezoelectric disc on the surface of an elastic solid," 2020 Smart Mater. Struct. 29 085002 (retrieved online on Sep. 3, 2022). (Year: 2020).*

* cited by examiner

*Primary Examiner* — Ryan M Ochylski
(74) *Attorney, Agent, or Firm* — Global IP Counselors, LLP (57) ABSTRACT

A 3D printing system includes a tank containing a liquid photopolymer resin. The tank includes an optically transparent window through which light is configured to pass. A heat exchanger is connected to the tank and is configured to cool the liquid polymer resin. A transducer is connected to the tank. The transducer is configured to emit an acoustic wave toward the optically transparent window.

20 Claims, 9 Drawing Sheets

3D PRINTING SYSTEM AND METHOD

BACKGROUND

Field of the Invention

The present invention generally relates to a system and method of 3D printing. More specifically, the present invention relates to a 3D printing system and method including a tank having a textured surface through which light is configured to pass and a transducer configured to emit an acoustic wave toward the textured surface.

Background Information 3D (three-dimensional) printing is the construction of a three-dimensional object from a digital file, such as a CAD model or a digital 3D model. A conventional additive manufacturing process creates the object by successively adding layers one at a time until the object is complete. One type of additive manufacturing process is vat polymerization, which includes stereolithography (SLA) and digital light processing (DLP) processes.

Figure 1:
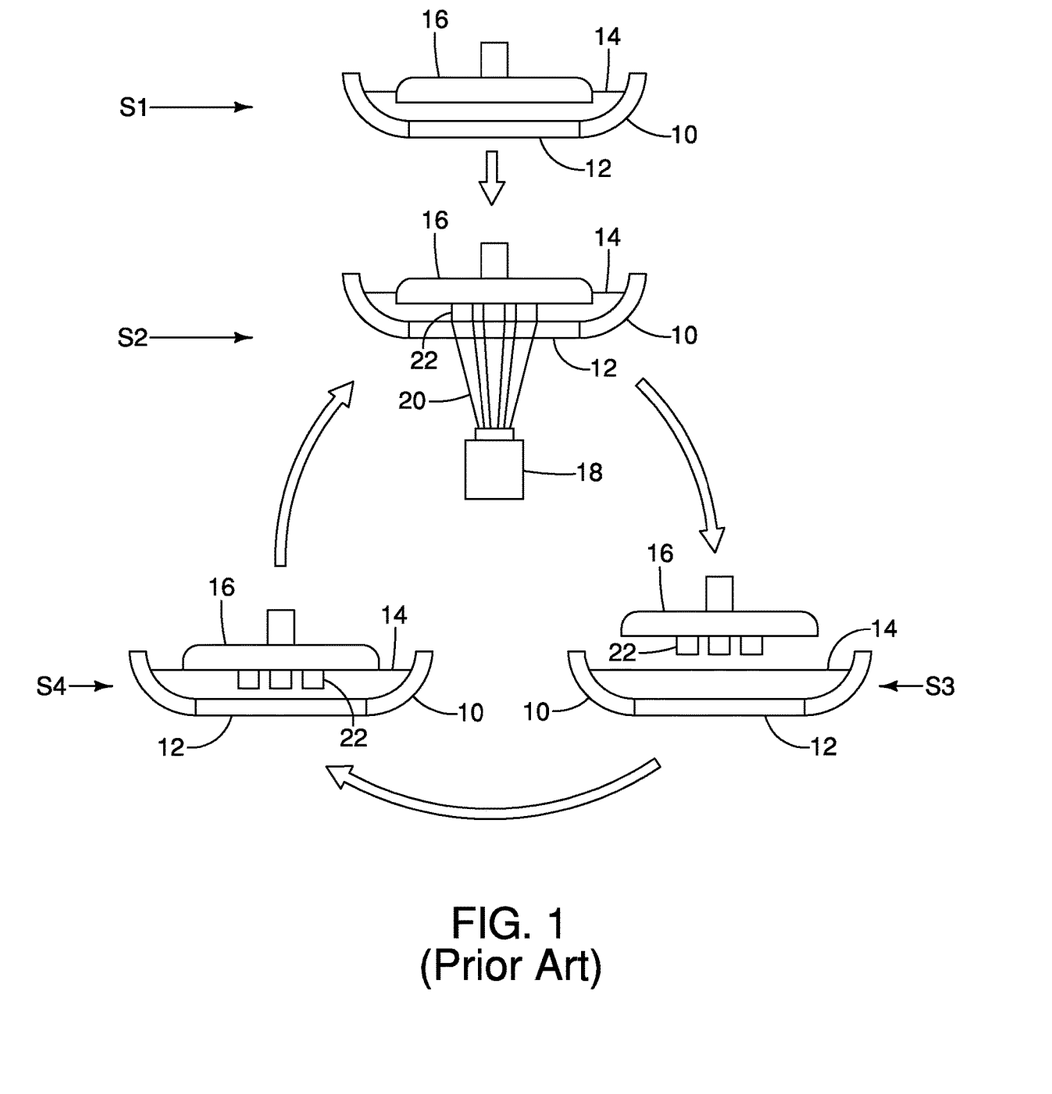
FIG. 1 is a schematic representation of a conventional 3D printing system and method.

As shown in step S1 of FIG. 1, DLP 3D printing includes a tank, or vat, 10 having a transparent projection window 12. The vat 10 contains a liquid polymer resin 14. A build platform 16, on which an object is to be printed, is lowered into the resin 14.

A light projection system 18, such as a laser, projector or LED/LCD panel, emits a light 20, such as ultraviolet light, through the transparent projection window 12 in the vat 10, as shown in Step S2 of FIG. 1. The emitted light 20 causes a reaction within the resin 14 in which the molecules bond together, or cure, to form a first layer of a solid object 22 on the build platform 16. The entire first layer is cured simultaneously. The build platform 16 is moved in a direction away from the transparent projection window 12 to form a second layer on the first layer. Layers are formed, one layer at a time, until the object is printed.

During the printing process, the polymerized resin can adhere to the transparent projection window 12 of the vat 10, which can interfere with forming additional layers on the build platform 16. Additionally, the gap between the build platform 16 and the transparent window 12, or between the formed solid object 22 on the build platform 16 and the transparent window 12 for subsequent layers, is small (e.g., a distance substantially equal to a thickness of one formed layer on the build platform). As shown in step S3 of FIG. 1, the build platform 16 is removed from the vat 10. Any polymerized resin adhered to the transparent window 12 of the vat 10 can be removed, and additional liquid polymer resin 14 can be added to the vat 10.

As shown in step S4 of FIG. 1, the build platform 16 is lowered into the liquid polymer resin 14 in the vat 10 until the appropriate distance between the printed object 22 and the transparent window 12 is obtained. The separation step of the build platform 16 from the vat 10 in step S3 and repositioning the build platform 16 in the vat 10 in step S4 are time consuming steps that slow down the DLP 3D printing process. Removing any resin adhered to the transparent window 12 further slows down the printing process.

Figure 2:
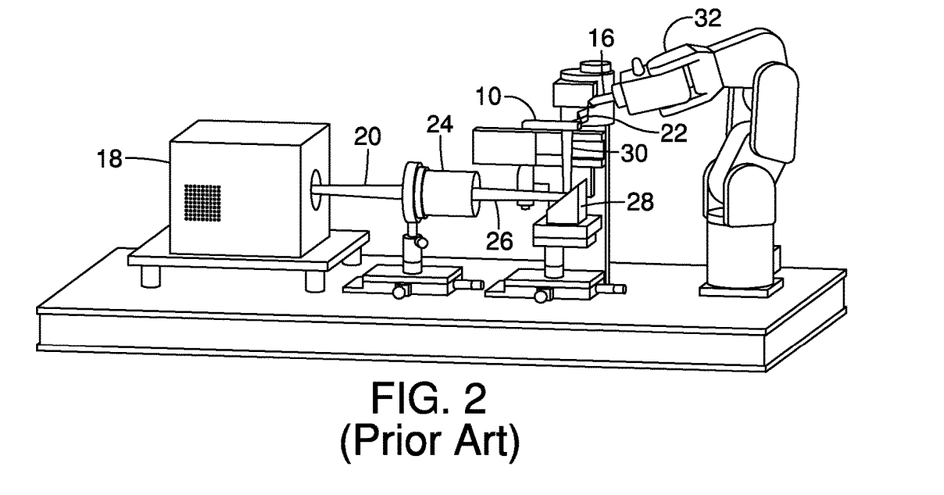
FIG. 2 is a perspective view of a conventional 3D printing system of FIG. 1.

A conventional 3D printing system used in the DLP 3D printing process of FIG. 1 is shown in FIG. 2. The light projection system 18 emits light, such as UV (ultraviolet) light, corresponding to a single image of the layer to be formed on the build platform 16. The emitted light 20 passes through a projection lens 24 to adjust the resolution of the emitted light 20. The projection lens 24 is selected based on the desired focal depth, such as 30 or 100 micrometers. The projected light 26 is transmitted to a mirror 28. The reflected light 30 is transmitted into the vat 10 through a transparent window 12 (FIG. 1) thereof. The reflected light 30 cures the resin in the vat 10 to form a first layer of the printed object 22. A robotic arm 32 moves the build platform 16 such that successive layers can be formed to construct the printed object 22.

SUMMARY

A need exists for a 3D printing system in which adhesion between the printed object and the window is substantially prevented. A need also exists for a 3D printing process in which the heat generated by the printing process is dissipated from a tank in which an object is printed. A need also exists for a 3D printing process in which fresh resin flows in a timely manner toward a gap between a printed object and a window to form a successive resin layer to facilitate continuous photopolymerization.

In view of the state of the known technology, one aspect of the present disclosure is to provide a 3D printing system including a tank containing a liquid photopolymer resin. The tank includes an optically transparent window through which light is configured to pass. A heat exchanger is connected to the tank and is configured to cool the liquid polymer resin. A transducer is connected to the tank. The transducer is configured to emit an acoustic wave toward the optically transparent window.

Another aspect of the present disclosure is to provide a 3D printing system including a tank containing a liquid photopolymer resin, and a rigid base on which an object is configured to be printed. The tank includes an optically transparent window through which light is configured to pass. An arm is connected to the rigid base to move the rigid base relative to the tank. A first transducer is connected to the tank and is configured to emit a first acoustic wave toward the optically transparent window. A second transducer is connected to the tank and is configured to emit a second acoustic wave toward the optically transparent window. The second transducer is disposed opposite the first transducer. A first heat exchanger is connected to the tank and is configured to cool the liquid polymer resin. The first heat exchanger is disposed proximate the first transducer. A second heat exchanger is connected to the tank and is configured to cool the liquid polymer resin. The second heat exchanger is disposed proximate the second transducer.

Also other objects, features, aspects and advantages of a 3D printing system and method will become apparent to those skilled in the art from the following detailed description, which, taken in conjunction with the annexed drawings, discloses exemplary embodiments of the 3D printing system and method.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 3:
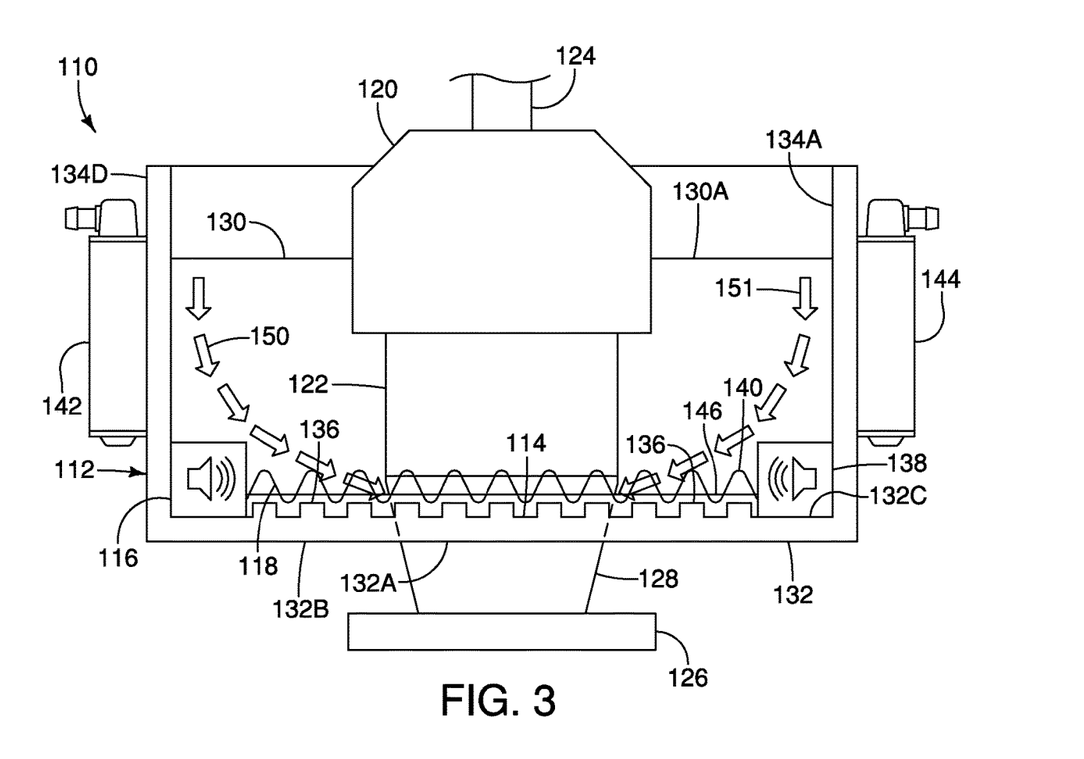
FIG. 3 is a side elevational view of a 3D printing system in accordance with an exemplary embodiment.

Referring initially to FIG. 3, a 3D printing system 110 in accordance with an exemplary embodiment includes a tank 112, a textured surface 114 connected to the tank 112, and a first transducer 116 configured to emit an acoustic wave 118 toward the textured surface 114. The 3D printing system 110 further includes a rigid base 120 on which an object 122 is to be printed and a control arm 124 connected to the rigid base 120.

The rigid base 120 has a print surface 120A on which the object 122 is configured to be printed, as shown in FIG. 3. The control arm 124 is connected to the rigid base 120 to move the rigid base 120 relative to the tank 112. The first transducer 116 is connected to the tank 112 and is configured to emit the first acoustic wave 118 toward the textured surface 114. A light source 126 is configured to emit light 128 to the tank 112 to form the printed object 122 on the rigid base 120.

The tank 112 contains a liquid photopolymer resin 130, as shown in FIGS. 3 and 6-8. The tank 112 can be any suitable shape to hold the liquid polymer resin 130 therein, such as rectangular or circular. The tank 112 has a base 132 and a side wall 134 extending upwardly from the base 130. The base 132 is preferably transparent such that the light 128 emitted from the light source 126 can pass through the base 132. The entirety of the base 132 can be transparent, or a portion of the base 132 can be transparent. The transparent portion of the base 132 constitutes an optically transparent window 132A through which the emitted light 128 can pass.

The rigid base, or build platform, build plate or print bed, 120 provides the surface 120A on which the object 122 is printed. The print surface 120A is preferably a planar surface, as shown in FIG. 3. The rigid base 120 can be made of any suitable material, such as plastic, such as polyactic acid (PLA), or glass.

The control arm 124 is connected to the rigid base 120 to control movement and positioning of the rigid base 120 during the printing process. The control arm 124 is connected to the rigid base 120 to move the rigid base 120 relative to the tank 112. The control arm 124 preferably has six degrees of freedom, such that the rigid base 120 can move through a curvilinear path to more accurately print the object 122. The control arm 124 is preferably a robotic arm having six degrees of freedom. The six degrees of freedom are movements along the three axes (i.e., the X, Y and Z axes), and rotation about each of the three axes (i.e., pitch, roll and yaw). Providing the control arm 124 with multiple degrees of freedom, such as six degrees of freedom, allows the control arm 124 to move the rigid base 120 through a curvilinear path, including moving the rigid base 124 to a plurality of positions, thereby allowing a more accurate object 122 to be printed.

The liquid polymer resin 130 is selectively cured by light-activated polymerization, such as by photopolymerization, which preferably uses visible or UV light, although light having any suitable wavelength can be used, to form in situ cross-linked polymer structures. The liquid polymer resin 130 preferably includes monomer and oligomer molecules that are converted to solid polymers during photopolymerization when the light 128 emitted by the light source 126 is guided through the transparent portion, or the optically transparent window 132A, of the base 132 of the tank 112.

The light source 126 emits light 128 to cure the liquid polymer resin 130 in the tank 112, as shown in FIG. 3. The light source 126 preferably emits UV light 128 having a wavelength between approximately 10 and 400 nanometers, inclusive. Preferably, the emitted UV light 128 has a wavelength between approximately 380 and 400 nanometers, inclusive. Light having any suitable wavelength can be used, such as, but not limited to, UV, visible and infrared light.

The liquid polymer resin 130 includes a photoinitiator that initiates photopolymerization in the tank 112 when the light 128 emitted by the light source 126 passes through the optically transparent window 132A of the base 132 of the tank 112. The photoinitiator absorbs light energy having a predetermined wavelength from the light 128 emitted by the light source 126 to the tank 112. The photoinitiator is preferably selected based on the wavelength of the light 128 emitted by the light source 126.

As shown in FIG. 3, the printed object 122 is formed on the surface 120A of the rigid base 120. The printed object 122 is based on a model supplied to a computer (now shown) that controls the 3D printing process. The light 128 emitted from the light source 126 is guided to the tank 112 to cure the liquid polymer resin 130 on the surface 120A of the rigid base 120 to form a first layer of the printed object 122. The control arm 124 is connected to the rigid base 120 to move the rigid base 120 relative to the tank 112 in a direction away from the optically transparent window 132A of the base 132. The rigid base 120 is moved a distance approximately equal to a thickness of the formed layer. The light 128 is emitted from the light source 126 to cure the liquid polymer resin 130 in the tank 112 to form a second layer on the first layer. This process is repeated until the entire object is printed. When the printing is complete, the printed object 122 can be removed from the print surface 120A of the rigid base 120.

As shown in FIG. 3, the textured surface 114 is connected to the tank 112. The textured surface 114 is preferably at least disposed on the optically transparent window 132A of the base 132. The textured surface 114 is configured such that the light 128 emitted by the light source 126 passes through the textured surface 114 to the liquid polymer resin 130 in the tank 112. The base 132 has an outer surface 132B that faces the light source 126 and an inner surface 132C that faces the liquid polymer resin 130 and the build plate 120. The textured surface 114 is formed on the inner surface 132C of the optically transparent window 132A facing the liquid polymer resin 130.

Figure 6:
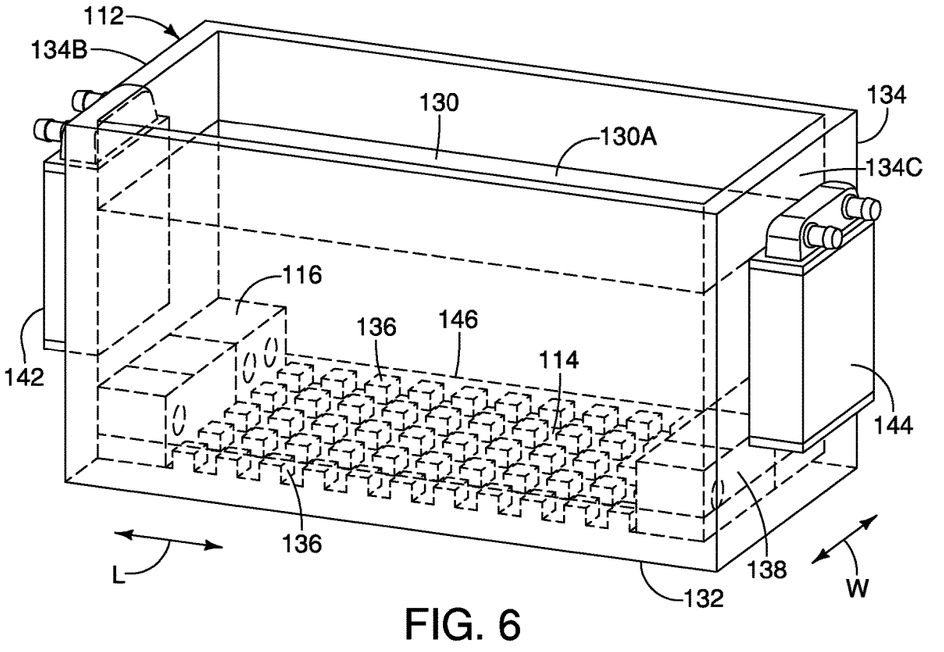
FIG. 6 is a perspective view of a tank of the 3D printing system of FIG. 3.
Figure 15:
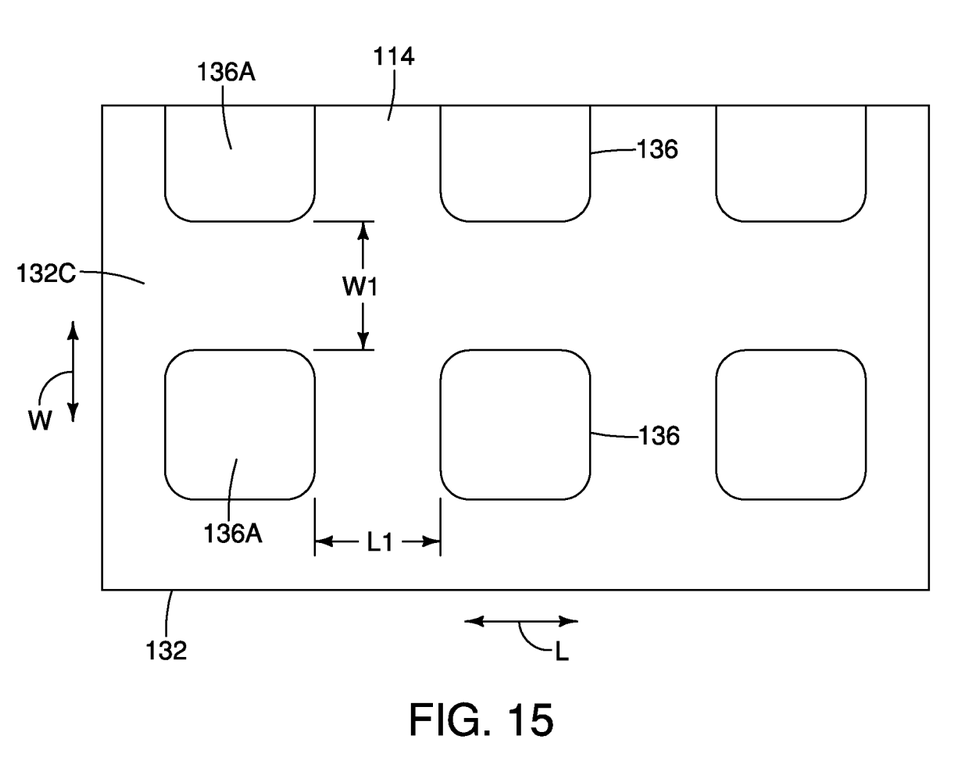
FIG. 15 is a top plan view of the textured surface of the tank of FIG. 3.

Referring to FIG. 3, the textured surface 114 is formed integrally with the base 132 of the tank 112. In other words, the textured surface 114 is the surface of the optically transparent window facing the liquid polymer resin 130. The textured surface 114 includes a plurality of protrusions 136 extending upwardly from the inner surface 132C of the base 132. The plurality of protrusions 136 form a plurality of rows extending in a length direction L of the base 132, and a plurality of columns extending in the width direction W of the base 132, as shown in FIGS. 6 and 15. Each protrusion 136 is preferably equally spaced from adjacent protrusions 136 in the row by a distance L1. Each protrusion 136 is preferably equally spaced from adjacent protrusions 136 in the column by a distance W1. Preferably, the distances L1 and W1 are substantially equal. The projections 136 are enlarged for visualization in the drawing figures. Preferably, the projections 136 measure a few microns or sub-microns in the x, y and z directions. For example, the textured surface 114 can include projections 136 measuring 10×10×10 microns.

Figure 5:
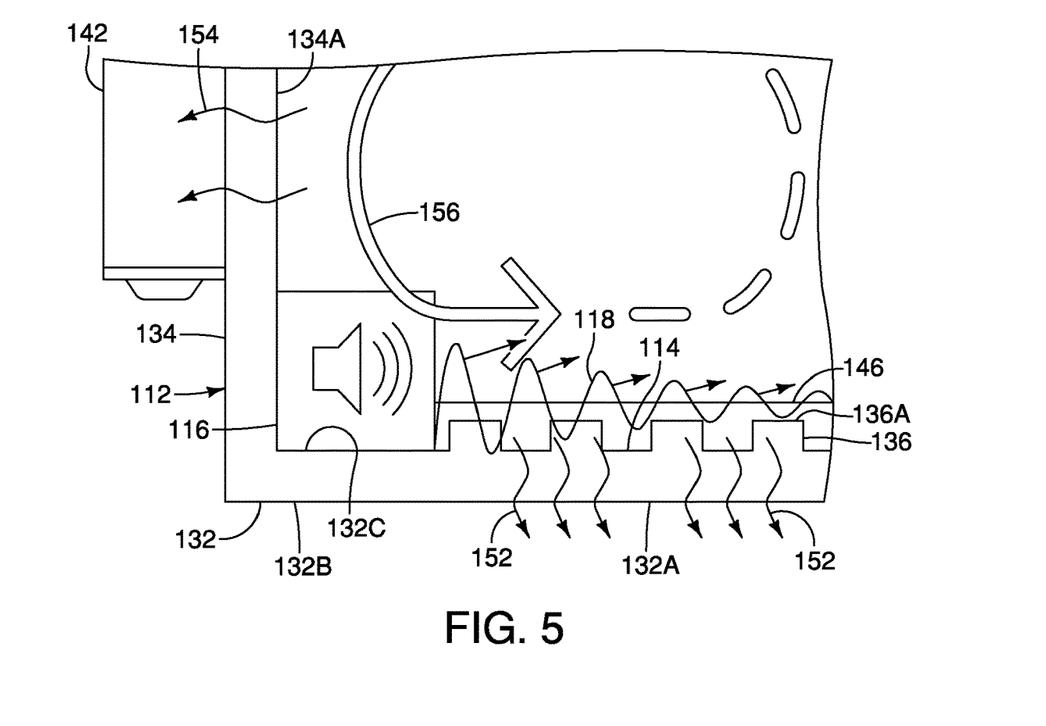
FIG. 5 is an elevational view of the 3D printing system of FIG. 3 illustrating a resin flow path generated by a transducer.

As shown in FIGS. 3 and 5-7, the protrusions have a substantially rectangular shape. The protrusions 136 increase the surface area of the inner surface 132C of the base 132 to increase heat dissipation of the heat generated during light radiation and resin polymerization. In other words, the protrusions 136 act like a heat sink to facilitate heat dissipation. As shown in FIG. 5, heat 152 generated during the light radiation and resin polymerization is dissipated from tank 112 through the textured surface 114.

Figure 14:
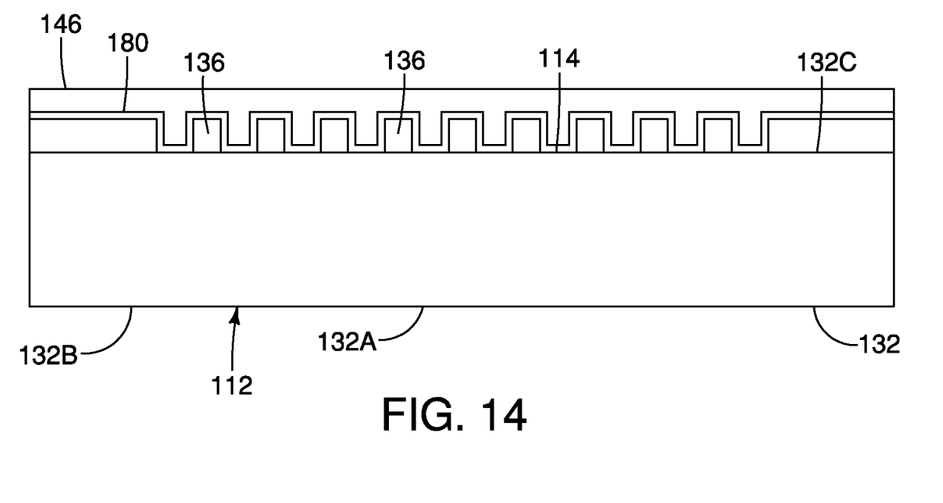
FIG. 14 is a side elevational view of the textured surface of the tank of FIG. 3 having a hydrophobic coating.

The textured surface 114 can be fabricated in any suitable manner, such as by photolithography, laser texturing, molding, or any other suitable patterning technique. The textured surface 114 can be further treated with a hydrophobic layer 180 to produce a hydrophobic or superhydrophobic surface, as shown in FIG. 14. The treated hydrophobic or superhydrophobic surface provides a thermodynamically favorable condition for impregnation by a layer of an inert liquid 146. For example, the textured surface 114 is formed of fused silica, which is treated with the hydrophobic layer 180 of silane to provide a hydrophobic textured surface. The textured surface 114 can be formed of any suitable optically transparent material. The hydrophobic layer 180 can be any suitable material to provide a hydrophobic or superhydrophobic surface to the textured surface 114.

Figure 7:
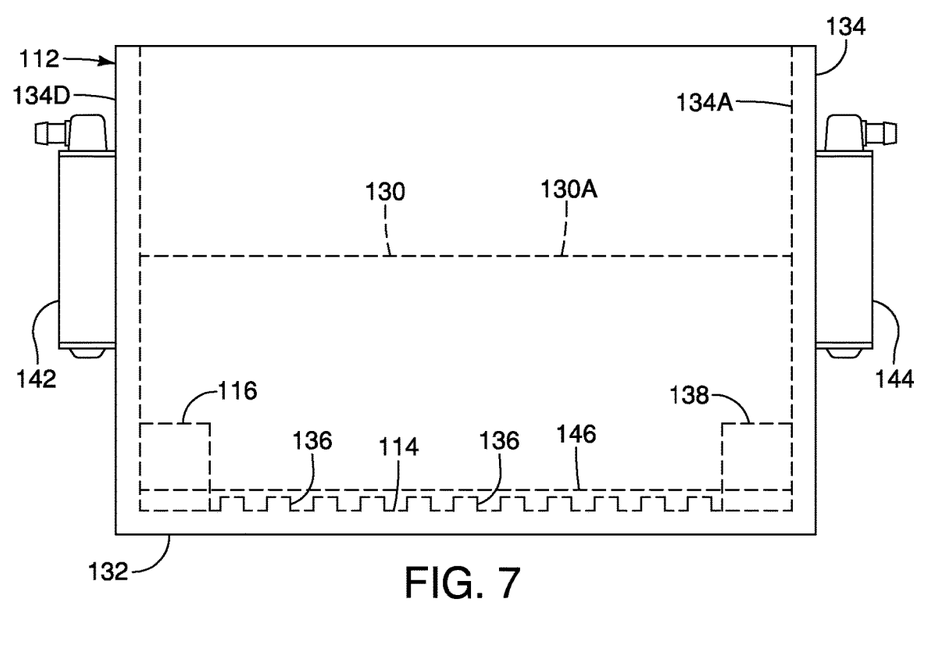
FIG. 7 is an elevational view of the tank of FIG. 6.

As shown in FIGS. 3, 6 and 7, the first transducer 116 is mounted on an interior surface of the tank 112. Preferably, the first transducer 116 is mounted on the inner surface 132C of the base 132. Alternatively, the first transducer 116 can be mounted on an inner surface 134A of the wall 134. As shown in FIG. 3, the first transducer 116 is mounted on the inner surface 132C of the base 112 and on the inner surface 134A of the wall 134 of the tank 112. The first transducer 116 is mounted at a height of the textured surface 114. The tank 112 is substantially rectangular as shown in FIG. 6, such that the first transducer 116 is disposed on a first wall 134B that is oppositely disposed a second wall 134C on which the second transducer 138 is disposed.

As shown in FIGS. 3, 6 and 7, a second transducer 138 is connected to the tank 112 and is configured to emit a second acoustic wave 140 toward the textured surface 114. The second transducer 138 is disposed opposite the first transducer 116. The second transducer 138 is preferably disposed at approximately the same height relative to the base 132 of the tank 112 as the first transducer 116.

A first heat exchanger 142 is connected to the tank 112, as shown in FIGS. 3, 6 and 7. The first heat exchanger 142 is configured to cool the liquid polymer resin 130. The first heat exchanger 142 is preferably mounted on an outer surface 134D of the wall 134 of the tank 112. The first heat exchanger 142 is preferably mounted to the same wall 134 to which the first transducer 116 is mounted. The first heat exchanger 142 is preferably mounted proximate the first transducer 116. The first heat exchanger 142 is preferably mounted higher than the first transducer 116 relative to the base 132 of the tank 112. In other words, the first heat exchanger 142 is preferably mounted higher than the first transducer 116 relative to the transparent window 132A of the tank 112. The first transducer 116 is preferably disposed such that at least a portion of the first transducer 116 is lower than an upper surface 130A of the liquid polymer resin 130 in the tank 112, as shown in FIGS. 3 and 7.

As shown in FIGS. 3, 6 and 7, a second heat exchanger 144 is connected to the tank 112. The second heat exchanger 144 is configured to cool the liquid polymer resin 130. The second heat exchanger 144 is preferably mounted on an outer surface 134D of the wall 134 of the tank 112. The second heat exchanger 144 is preferably mounted to the same wall 134 to which the second transducer 138 is mounted. The second heat exchanger 144 is preferably mounted proximate the second transducer 138. The second heat exchanger 144 is preferably mounted higher than the second transducer 138 relative to the base 132 of the tank 112. In other words, the second heat exchanger 144 is preferably mounted higher than the second transducer 138 relative to the transparent window 132A of the tank 112.

The first and second heat exchangers 142 and 144 can be any suitable heat exchangers. The first and second heat exchangers 142 and 144 can be passive or active heat exchangers that facilitate extracting and removing heat from the liquid polymer resin 130 in the tank 112 generated by the emitted light 128 and the photopolymerization process of printing the printed object 122. The first and second heat exchangers 142 and 144 can include a pettier module to facilitate removing heat from the liquid polymer resin 130. Alternatively, the first and second heat exchangers 142 and 144 can be mounted on an inner surface 134A of the wall 134 of the tank 112. Alternatively, the heat exchangers can be implemented into the textured surface 114 to provide direct cooling of the printing region in an active or passive manner. Alternatively, the heat exchangers can be passively or actively circulated by a cooling radiator to facilitate transferring cooler resin from an upper end of the tank 112 to a lower end of the tank 112. A temperature sensor (not shown) can be disposed in the liquid polymer resin 130 in the tank 112 to monitor the temperature of the resin 130 such that the first and second heat exchangers 142 and 144 can be controlled to maintain the liquid polymer resin 130 at a predetermined temperature.

Figure 12:
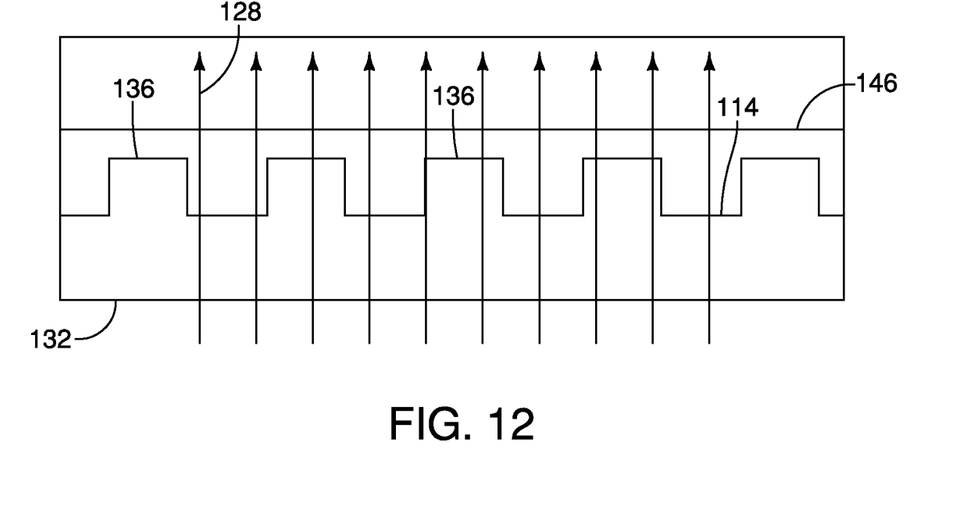
FIG. 12 is a schematic representation of an inert layer disposed on a textured surface of the tank of FIG. 3.

A layer of an inert liquid 146 is disposed on the textured surface 114, as shown in FIGS. 3 and 5-7. The inert liquid 146 facilitates preventing adhesion between the liquid polymer resin 130 and the textured surface 114. The inert liquid 146 is preferably disposed above upper surfaces 136A of the projections 136 of the textured surface 114. A refractive index of the inert liquid 146 is approximately equal to a refractive index of the textured surface 114. Referring to FIG. 12, substantially matching the refractive indices of the inert liquid 146 and the textured surface 114 minimizes diffraction of the light 128 emitted by the light source 126 (FIG. 3) to facilitate maintaining printing resolution. The inert liquid 146 is preferably immiscible and non-reactive with the liquid polymer resin 130. Preferably, the inert liquid 146 has a higher density than the liquid polymer resin 130 to facilitate the inert liquid 146 being disposed between the textured surface 114 and the liquid polymer resin 130. The inert liquid 146 can be any suitable liquid, such as perfluoropolyether copolymers, fluorosilicone polymers, perfluorocarbon liquid, allicin or garlic oils, Chemours Krytox GPL oil, and Solvay Fomblin Y oil.

The emitted light 128 (FIG. 3) passing through the layer of the inert liquid 146 exhibits minimal attenuation, such that the transmitted power of the emitted light is substantially not reduced. The resulting 3D printing process is energy efficient such that high-speed fabrication of parts is possible with the 3D printing process in accordance with the exemplary embodiments. Existing methods to prevent resin adhesion during the printing process, such as forming a resin dead zone between the transparent window and the printed part, results in problematic light attenuation, which reduces the transmitted power of the emitted light and greatly reduces the obtainable printing speed of the existing 3D printing systems.

Referring to FIGS. 3, 5, 6 and 7, the first and second transducers 116 and 138 are mounted to the inner surface 134A of the wall 134 of the tank 112 and the first and second heat exchangers 142 and 144 are mounted to the outer surface 134D of the wall 134 of the tank 134. The first and second transducers 116 and 138 are oppositely disposed. The first and second heat exchangers 142 and 144 are oppositely disposed. The first and second heat exchangers 142 and 144 are disposed above the first and second transducers 116 and 138 relative to the optically transparent window 132A of the base 132.

As shown in FIGS. 3 and 5, the first and second heat exchangers 142 and 144 extract heat 154 from the resin 130. Removing the heat cools the liquid polymer resin 130, which increases the density of the resin 130. As indicated by the flow arrows 150 and 151, the increased density of the liquid polymer resin 130 proximal the first and second heat exchangers 142 and 144 imparts a downward flow of the resin 130. The first and second heat exchangers 142 and 144 are configured to cool the liquid polymer resin 130 in the tank 112 to facilitate flow of the liquid polymer resin 30 toward the first and second transducers 116 and 138, respectively. The wall 134 of the tank 112 is heat dissipative to facilitate removing the heat 154 from the liquid polymer resin 130. The thermal conductivity of the heat dissipative wall 134 of the tank further facilitates dissipating heat from the resin 130 as the resin flows downwardly proximal the inner surface 134A of the wall 134, as indicated by the resin flow arrows 150 and 151.

The first and second transducers 116 and 138 emit first and second acoustic waves 118 and 140, as shown in FIGS. 3 and 5. Preferably, as shown in FIG. 3, a first direction of the first acoustic wave 118 is substantially parallel to a second direction of the second acoustic wave 140. The first and second acoustic waves 118 and 140 facilitate guiding the resin 130 toward the printed object 122.

As shown in FIGS. 3 and 5, the flow 150 and 151 of the cooled resin flows toward the textured surface 114, and the first and second transducers 116 and 138 facilitate guiding the cooled resin toward the printed object 122. As shown in FIG. 5, a circular flow 156 is imparted to the resin 130 by the combination of the first and second heat exchangers 142 and 144 and the first and second transducers 116 and 138 to facilitate guiding resin to a build area of the printed object 122. The first and second heat exchangers 142 and 144 cool the resin as it flows downwardly proximal the inner surface 134A of the wall 134, and the textured surface 114 further facilitates cooling the resin 130 as it flows substantially horizontally across the textured surface 114, as indicated by the flow arrows 150 and 151 in FIG. 3.

Figure 13:
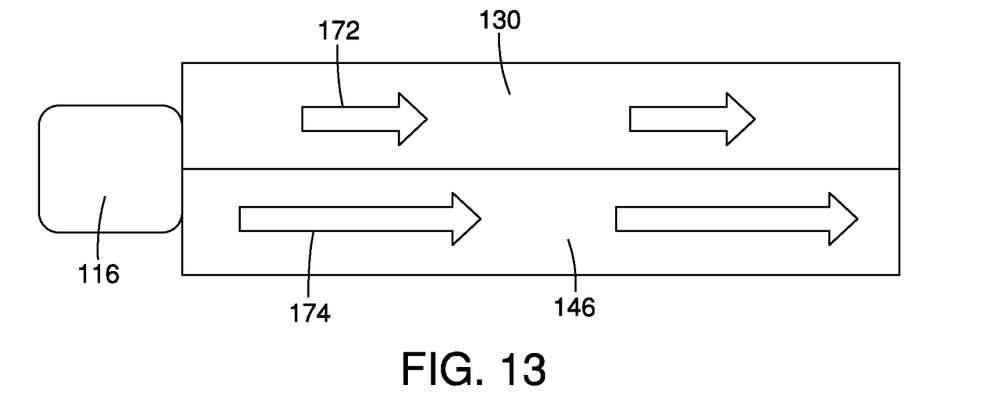
FIG. 13 is a schematic representation of speeds at which acoustic waves generated by a transducer travel through the inert layer and the resin of FIG. 12.

Referring to FIG. 13, the first and second acoustic waves 118 and 140 travel through the resin 130 and the inert liquid 146. The portion 174 of the acoustic wave generated by the first transducer 116 traveling through the inert liquid 146 travels faster than the portion 172 of the acoustic wave generated by the first transducer 116 through the resin 130. The faster moving acoustic waves 174 in the inert liquid relative to the slower moving acoustic waves 172 in the resin 130 generates a shearing effect at the interface between the inert liquid 146 and the liquid polymer resin 130. The generated shearing effect substantially prevents adhesion of the liquid polymer resin 130 to the textured surface 114 of the optically transparent window 132A.

Further, the first and second transducers 116 and 138 are mounted on an interior surface 132C of the tank 112 such that the emitted the first and second acoustic waves 118 and 140 travel through the inert liquid layer 146 and the liquid polymer resin 130, which generates a shear vibration at the interface between the inert liquid layer 146 and the liquid polymer resin 130 to further facilitate resin flow. The shear vibration further reduces the interfacial friction force at the interface between the inert liquid layer 146 and the liquid polymer resin 130 to facilitate resin flow.

The layer of the inert liquid 146 is inert to the photopolymerization reaction occurring during the 3D printing process. The textured surface 114 stabilizes the layer of the inert liquid 146 to reduce the shear resistance of the resin flow and to substantially prevent resin adhesion, such that the speed of the 3D printing process is improved. The first and second transducers 116 and 138 control the acoustic energy flow to guide the direction flow of the liquid polymer resin 130, as indicated by the resin flow arrows 150 and 151 in FIGS. 3 and 156 in FIG. 5. The first and second transducers 116 and 138 further facilitate controlling the resin flow to improve the speed of the 3D printing process. The first and second heat exchangers 142 and 144, in addition to the textured surface 114, further improve controlling the resin flow by removing heat from the resin. The textured surface 114 scatters the incident acoustic waves to further facilitate resin flow toward the rigid base 120.

Figure 4:
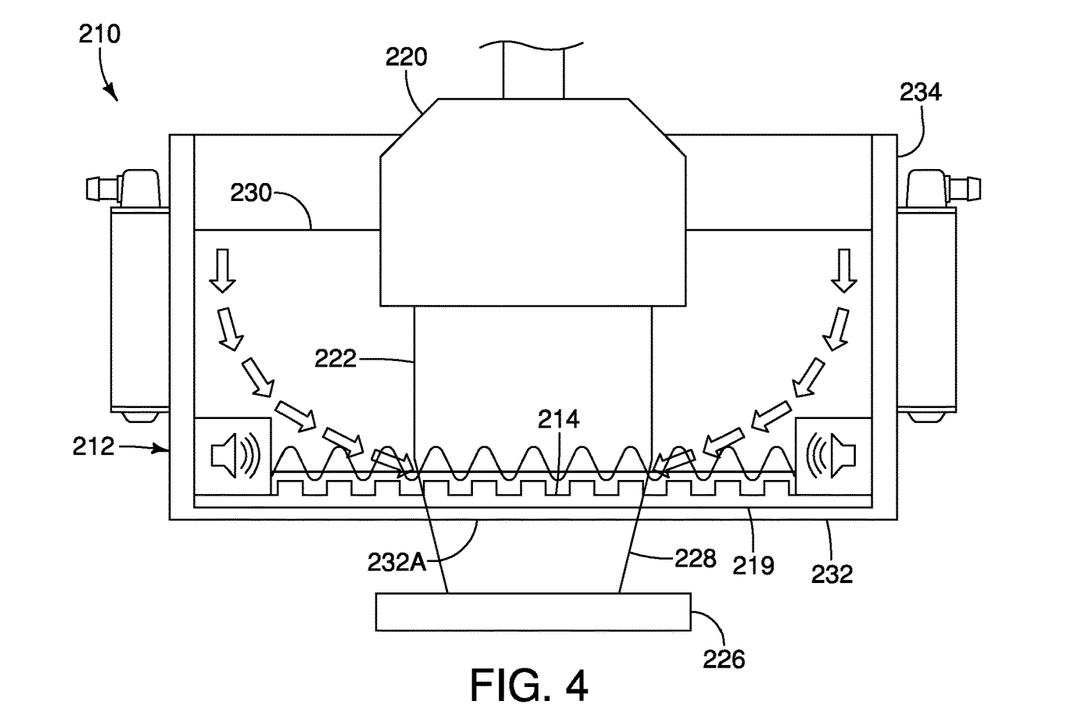
FIG. 4 is a side elevational view of a 3D printing system in accordance with another exemplary embodiment.

As shown in FIG. 4, a 3D printing system and method 210 in accordance with another illustrated exemplary embodiment is substantially similar to the 3D printing system and method 110 of the exemplary embodiment illustrated in FIGS. 3 and 5-7 except for the differences described below.

Similar parts are identified with similar reference numerals, except increased by 100 (i.e., 2xx, accordingly).

The 3D printing system 210 illustrated in FIG. 4 includes a textured surface 214 that is an insert 219 in the tank 212. The textured surface 214 is made of an optically transparent material that overlies the optically transparent window 232A of the base 232 such that the light 228 emitted by the light source 226 passes through the window 232A and the textured surface 214 into the liquid polymer resin 230 to form a printed object 222 on the rigid base 220. The insert 219 is disposed adjacent the optically transparent window 232A. The textured surface 214 is the surface of the insert 219 facing the liquid polymer resin 230. The insert 219 can be easily replaced when the textured surface 214 deteriorates with time and use.

Alternatively, the insert 219 can include the base 232 of the tank 212. In other words, the insert 219 is connected in an opening defined by the wall 234 of the tank 212.

Figure 8:
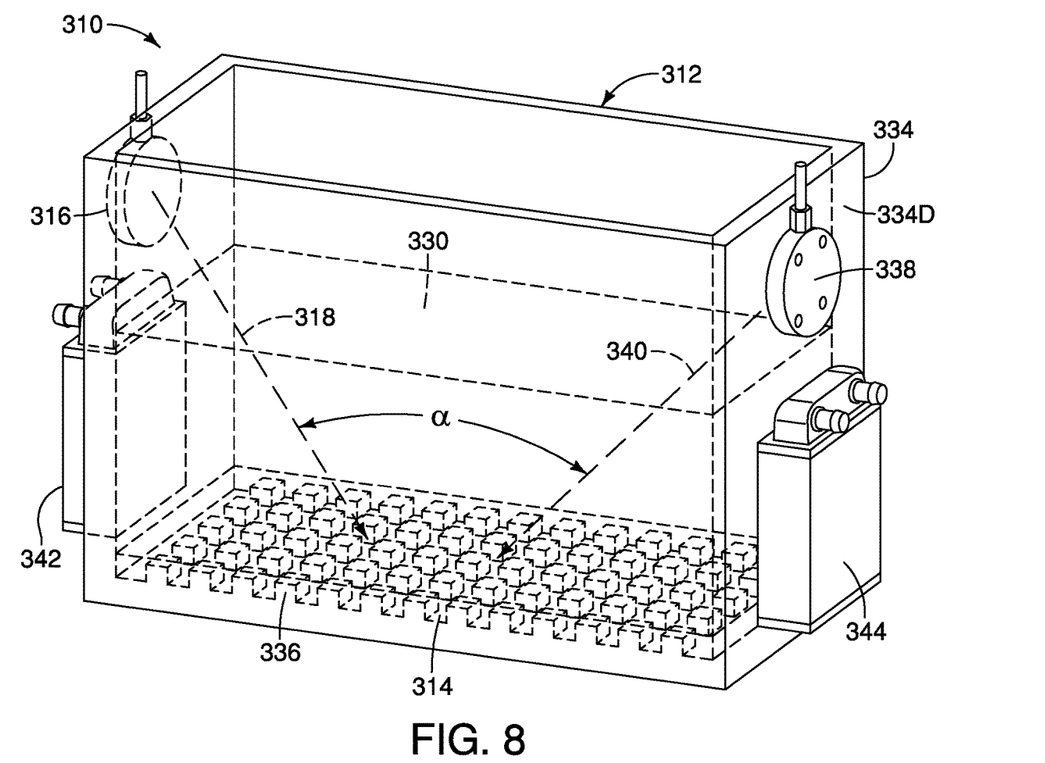
FIG. 8 is an elevational view of a tank of a 3D printing system in accordance with another exemplary embodiment in which a transducer is connected to an upper portion of a tank.
Figure 9:
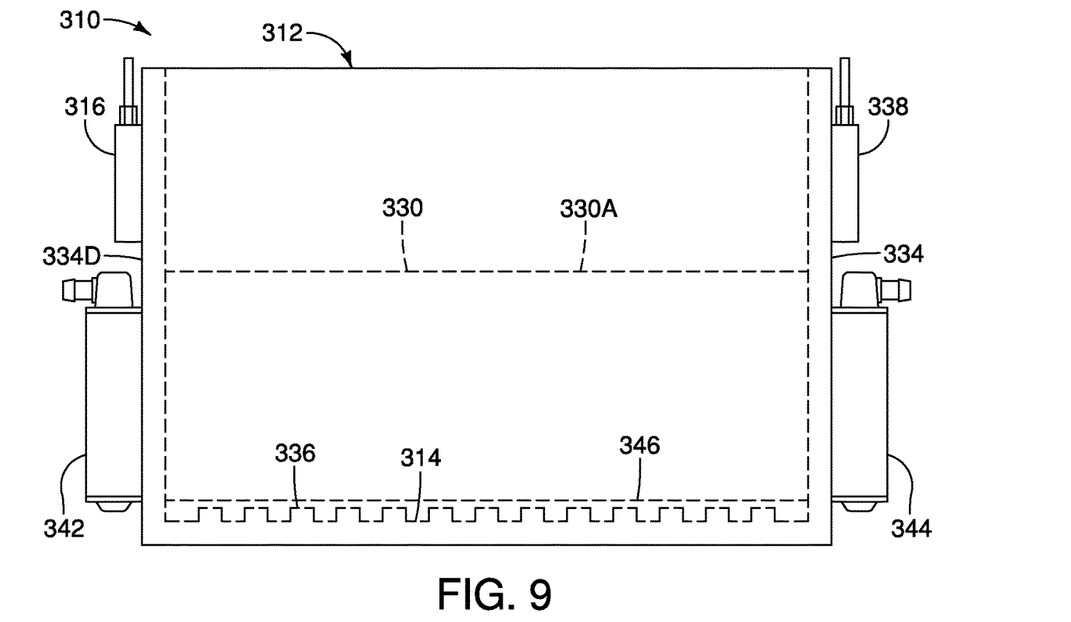
FIG. 9 is a side elevational view of the tank of FIG. 8.

As shown in FIGS. 8 and 9, a 3D printing system and method 310 in accordance with another illustrated exemplary embodiment is substantially similar to the 3D printing system and method 110 of the exemplary embodiment illustrated in FIGS. 3 and 5-7 except for the differences described below. Similar parts are identified with similar reference numerals, except increased by 200 (i.e., 3xx, accordingly).

The first and second transducers 316 and 338 and are mounted on an outer surface of the wall 334 of the tank 312. The first and second heat exchangers 342 and 344 are mounted on the outer surface 334D of the wall 334 of the tank 312. The first transducer 316 is disposed above the first heat exchanger 342. The second transducer 338 is disposed above the second heat exchanger 344. In other words the first heat exchanger 342 is mounted lower than the first transducer 316 relative to the transparent window of the tank 312, and the second heat exchanger 344 is mounted lower than the second transducer 344 relative to the transparent window of the tank 312. The first and second transducers 316 and 338 are disposed above an upper surface of the liquid polymer resin 330 in the tank 330.

The first transducer 316 emits a first acoustic wave 318 toward the textured surface 314. The second transducer 338 emits a second acoustic wave 340 toward the textured surface 314. A non-zero angle α is formed between the first direction of the first acoustic wave 318 and a second direction of the second acoustic wave 340, as shown in FIG. 8. The first and second directions of the first and second acoustic waves 318 and 340 are not parallel.

The first and second transducers 316 and 338 are disposed above the protrusions 336 of the textured surface 314 and above the layer of the inert liquid 346. The first and second transducers 316 and 338 are preferably disposed above an upper surface 330A of the resin 330 in the tank 312.

Figure 10:
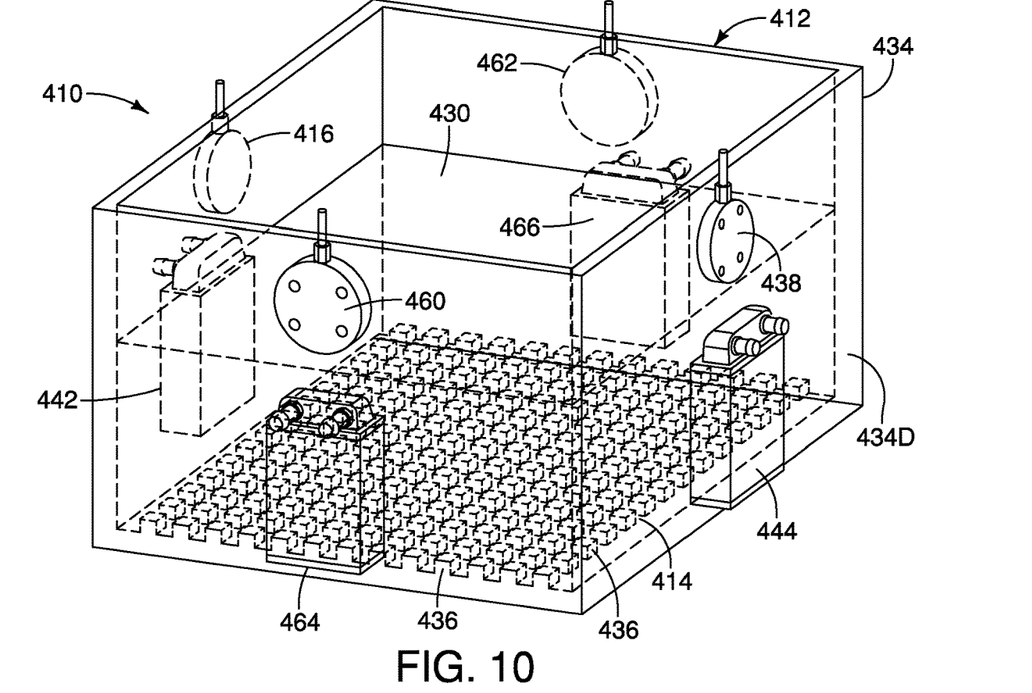
FIG. 10 is a perspective view of a 3D printing system in accordance with yet another exemplary embodiment in which a plurality of transducers are mounted to a tank.
Figure 11:
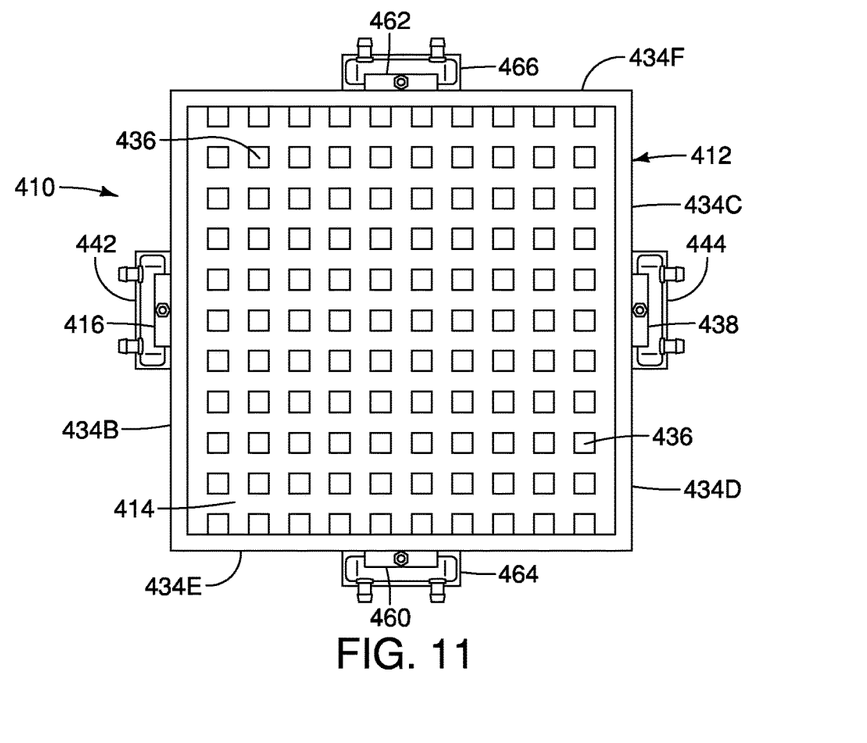
FIG. 11 is a top plan view of the tank of FIG. 10.

As shown in FIGS. 10 and 11, a 3D printing system and method 410 in accordance with another illustrated exemplary embodiment is substantially similar to the 3D printing system and method 110 of the exemplary embodiment illustrated in FIGS. 3 and 5-7 except for the differences described below. Similar parts are identified with similar reference numerals, except increased by 300 (i.e., 4xx, accordingly).

Referring to FIGS. 10 and 11, the tank 412 is substantially rectangular. A transducer 416 and a heat exchanger 442 are mounted on an outer surface 434D of each of the wall 434. A first transducer 416 is mounted above a first heat exchanger 442 on a first wall 434B. A second transducer 438 is mounted above a second heat exchanger 444 on a second wall 434C. The second wall 434C is disposed opposite the first wall 434B. A third transducer 460 is mounted above a third heat exchanger 464 on a third wall 434E. A fourth transducer 462 is mounted above a fourth heat exchanger 466 on a fourth wall 434F. The fourth wall 434F is disposed opposite the third wall 434E. The third transducer is configured to emit a third acoustic wave, and the fourth transducer 462 is configured to emit a fourth acoustic wave. The third transducer 460 is disposed opposite the fourth transducer 462.

The transducers 416, 438, 460 and 462 emit acoustic waves similarly to the acoustic waves of the transducers illustrated in FIG. 8. In other words, the acoustic waves emitted by the oppositely disposed transducers form non-zero angles. The transducers emit acoustic waves toward the textured surface 414.

The first to fourth transducers 416, 438, 460 and 462 are disposed above the protrusions 436 of the textured surface 414 and above the layer of the inert liquid. The first to fourth transducers 416, 438, 460 and 462 are preferably disposed above an upper surface of the resin 430 in the tank 412.

Figure 16:
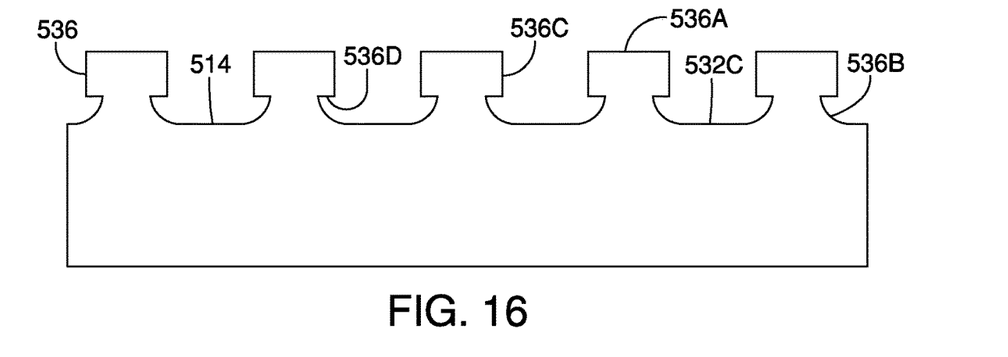
FIG. 16 is side elevational view of the textured surface of FIG. 15.
Figure 17:
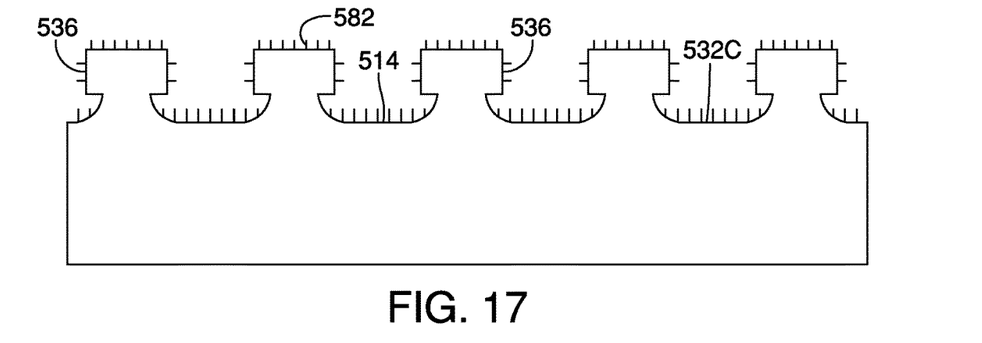
FIG. 17 is a side elevational view of the textured surface of FIG. 15 having hydrophobic nanostructures.

As shown in FIGS. 16 and 17, a textured surface 514 in accordance with another illustrated exemplary embodiment is substantially similar to the textured surface 114 of the 3D printing system and method 110 of the exemplary embodiment illustrated in FIGS. 3 and 5-7 except for the differences described below. Similar parts are identified with similar reference numerals, except increased by 400 (i.e., 5xx, accordingly).

Each of the protrusions 536 extends from the inner surface 532C, as shown in FIGS. 16 and 17. Each protrusion 536 has a substantially planar upper surface 536A. A connecting portion 536B connects an upper portion 536C of the protrusion 536 to the inner surface 532C. The connecting portion 536B tapers inwardly to a lower surface 536D of the upper portion 536C of the protrusion 536. The upper portion 536C has a substantially rectangular cross section.

As shown in FIG. 17, the inner surface 532C and the protrusions 536 can include nanostructures 582. The nanostructures 582 are preferably hydrophobic, thereby further enhancing the hydrophobicity of the textured surface 514.

Figure 18:
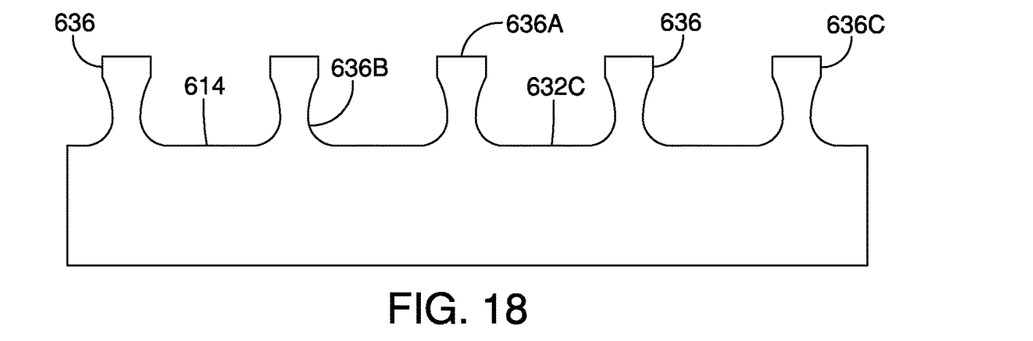
FIG. 18 is a side elevational view of a textured surface in accordance with another exemplary embodiment.
Figure 19:
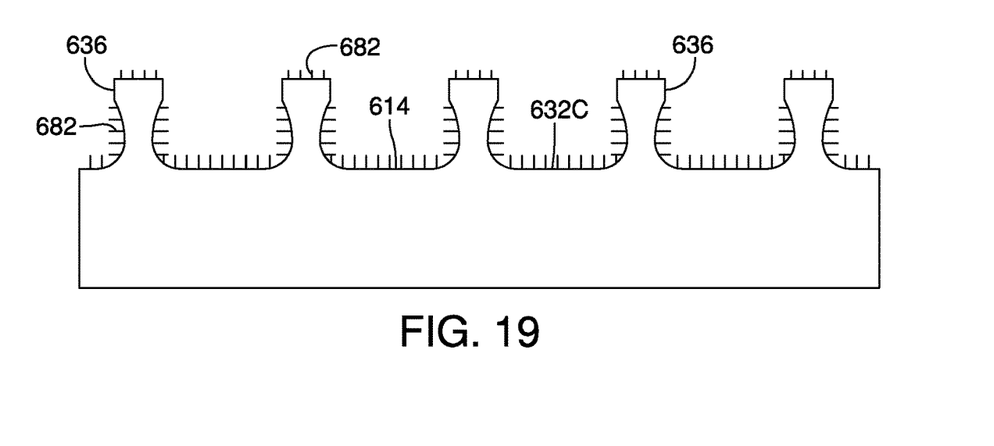
FIG. 19 is a side elevational view of the textured surface of FIG. 18 having hydrophobic nanostructures.

As shown in FIGS. 18 and 19, a 3D printing system and method 210 in accordance with another illustrated exemplary embodiment is substantially similar to the 3D printing system and method 110 of the exemplary embodiment illustrated in FIGS. 3 and 5-7 except for the differences described below. Similar parts are identified with similar reference numerals, except increased by 500 (i.e., 6xx, accordingly).

Each of the protrusions 636 extends from the inner surface 632C, as shown in FIGS. 17 and 18. Each protrusion 636 has a substantially planar upper surface 636A. A connecting portion 636B connects an upper portion 636C of the protrusion 636 to the inner surface 632C. The connecting portion 636B has a first portion that tapers inwardly moving away from the inner surface 632C, and a second portion that tapers outwardly toward the upper portion 636C. The connecting portion 636B has a substantially concave outer surface. The upper portion 636C has a substantially rectangular cross section.

As shown in FIG. 18, the inner surface 632C and the protrusions 636 can include nanostructures 682. The nanostructures 582 are preferably hydrophobic, thereby further enhancing the hydrophobicity of the textured surface 614.

The layer of the inert liquid in addition to the acoustic wave emitted by the transducer in accordance with the disclosure substantially prevents resin adhesion during the 3D printing process to eliminate the up and down motion of the rigid base performed in existing 3D printing processes. The acoustic waves emitted by the transducer in addition to the resin cooling provided by the heat exchanger in accordance with the disclosure facilitates resin flow to improve 3D printing speed. The provided resin cooling allows continuous, large volumetric 3D printing by minimizing the effects associated with thermal curing caused by over-heated resin.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A 3D printing system comprising:
a tank containing a liquid photopolymer resin, the tank including an optically transparent window through which light is configured to pass;
a heat exchanger connected to the tank and configured to cool the liquid polymer resin; and
a transducer connected to the tank, the transducer being configured to emit an acoustic wave toward the optically transparent window,
the heat exchanger and the transducer being disposed on a same wall of the tank, one of the heat exchanger and the transducer being disposed between the transparent window and the other of the heat exchanger and the transducer,
the heat exchanger and the acoustic wave emitted by the transducer being configured to facilitate flow of the liquid polymer resin toward the optically transparent window.

2. The 3D printing system according to claim 1, wherein the heat exchanger is configured to cool the liquid polymer resin to facilitate flow of the liquid polymer resin toward the transducer.

3. The 3D printing system according to claim 1, wherein the heat exchanger is mounted on an outer surface of the wall of the tank.

4. The 3D printing system according to claim 3, wherein the wall is heat dissipative.

5. The 3D printing system according to claim 3, wherein the transducer is mounted between the transparent window of the tank and the heat exchanger.

6. The 3D printing system according to claim 1, wherein at least a portion of the heat exchanger is disposed lower than an upper surface of the liquid polymer resin in the tank.

7. The 3D printing system according to claim 1, wherein the transducer is disposed on an inner surface of the tank, and the heat exchanger is disposed on an outer surface of the tank.

8. The 3D printing system according to claim 1, wherein the transducer is disposed on an outer surface of the tank, and the heat exchanger is disposed on an outer surface of the tank.

9. The 3D printing system according to claim 7, wherein the heat exchanger is mounted between the transducer and the transparent window of the tank.

10. A 3D printing system comprising:
a tank containing a liquid photopolymer resin, the tank including an optically transparent window through which light is configured to pass;
a rigid base on which an object is configured to be printed;
an arm connected to the rigid base to move the rigid base relative to the tank;
a first transducer connected to the tank and configured to emit a first acoustic wave toward the optically transparent window; and
a second transducer connected to the tank and configured to emit a second acoustic wave toward the optically transparent window, the second transducer being disposed on an opposite side of the tank from the first transducer;
a first heat exchanger connected to the tank and configured to cool the liquid polymer resin, the first heat exchanger and the first transducer being disposed on a first wall of the tank and
a second heat exchanger connected to the tank and configured to cool the liquid polymer resin, the second heat exchanger and the second transducer being disposed on a second wall of the tank,
the first and second heat exchangers and the first and second acoustic waves emitted by the first and second transducers being configured to facilitate flow of the liquid polymer resin toward the optically transparent window.

11. The 3D printing system according to claim 10, wherein
a non-zero angle is formed between a first direction of the first acoustic wave and a second direction of the second acoustic wave.

12. The 3D printing system according to claim 10, wherein
a first direction of the first acoustic wave is substantially parallel to a second direction of the second acoustic wave.

13. The 3D printing system according to claim 10, wherein
the first and second heat exchangers are configured to cool the liquid polymer resin to facilitate flow of the liquid polymer resin toward the first and second transducers, respectively.

14. The 3D printing system according to claim 10, wherein
the first and second heat exchangers are mounted on outer surfaces of first and second walls, respectively, of the tank.

15. The 3D printing system according to claim 14, wherein
the first and second walls are heat dissipative.

16. The 3D printing system according to claim 10, wherein
the first transducer is mounted between the transparent window of the tank and the first heat exchanger, and the second transducer is mounted between the transparent window of the tank and the second heat exchanger.

17. The 3D printing system according to claim 10, wherein
the first and second transducers are disposed on an inner surface of the tank, and the first and second heat exchangers are disposed on an outer surface of the tank.

18. The 3D printing system according to claim 10, wherein
the first and second transducers are disposed on an outer surface of the tank, and the first and second heat exchangers are disposed on an outer surface of the tank.

19. The 3D printing system according to claim 10, wherein
the first heat exchanger is mounted between the first transducer and the transparent window of the tank, and the second heat exchanger is mounted between the second transducer and the transparent window of the tank.

20. The 3D printing system according to claim 10, wherein
the first and second walls are disposed on opposite sides of the rigid base.

* * * * *